United States Patent
Guo et al.

(10) Patent No.: US 11,254,832 B2
(45) Date of Patent: Feb. 22, 2022

(54) FLUID SETS

(71) Applicant: Hewlett-Packard Development Company, L.P., Spring, TX (US)

(72) Inventors: Dennis Z. Guo, San Diego, CA (US); Jie Zheng, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/765,574

(22) PCT Filed: Jan. 17, 2018

(86) PCT No.: PCT/US2018/013962
§ 371 (c)(1),
(2) Date: May 20, 2020

(87) PCT Pub. No.: WO2019/143323
PCT Pub. Date: Jul. 25, 2019

(65) Prior Publication Data
US 2020/0308436 A1 Oct. 1, 2020

(51) Int. Cl.
*C09D 11/54* (2014.01)
*B41M 5/00* (2006.01)
(Continued)

(52) U.S. Cl.
CPC .............. *C09D 11/54* (2013.01); *B41J 2/2107* (2013.01); *B41M 5/0023* (2013.01);
(Continued)

(58) Field of Classification Search
CPC ....... C09D 11/107; C09D 11/36; C09D 11/40; C09D 11/30; C09D 11/38; C09D 11/32;
(Continued)

(56) References Cited

U.S. PATENT DOCUMENTS 7,425,062 B2 * 9/2008 Bauer .................... C09D 11/30
347/100
2004/0063089 A1 4/2004 Imaizumi et al.
(Continued)

FOREIGN PATENT DOCUMENTS

EP 0792745 9/1997
EP 0305172 11/1997
(Continued)

OTHER PUBLICATIONS

International Search Report dated Nov. 15, 2018 for PCT/US2018/013962, Applicant Hewlett-Packard Development Company, L.P.

*Primary Examiner* — Manish S Shah
(74) *Attorney, Agent, or Firm* — Thorpe North & Western LLP

(57) ABSTRACT

A fluid set can include an ink composition having an acidic pH and a crosslinker composition having a basic pH from pH 8 to pH 10. The ink composition can include from 60 wt % to 90 wt % water, from 5 wt % to 30 wt % organic co-solvent, from 1 wt % to 6 wt % pigment, a sulfonated dispersant, and an acrylic polymer binder. The crosslinker composition can include from 70 wt % to 95 wt % water, from 1 wt % to 25 wt % organic co-solvent, and from 0.5 wt % to 5 wt % polycarbodiimide.

16 Claims, 2 Drawing Sheets

300

Separately ejecting i) an ink composition having an acidic pH and ii) a crosslinker composition having a basic pH from pH 8 to pH 10, wherein after ejecting, the ink composition and the crosslinker composition are in contact on a synthetic fabric substrate, the ink composition including from 60 wt% to 90 wt% water, from 5 wt% to 30 wt% organic co-solvent, from 1 wt% to 6 wt% pigment, a sulfonated dispersant, and an acrylic polymer binder, and the crosslinker composition including from 70 wt% to 95 wt% water, from 1 wt% to 25 wt% organic co-solvent, and from 0.5 wt% to 5 wt% polycarbodiimide

310

(51) Int. Cl.
*C09D 11/033* (2014.01)
*C09D 11/037* (2014.01)
*C09D 11/107* (2014.01)
*C09D 11/322* (2014.01)
*C09D 11/38* (2014.01)
*C09D 11/40* (2014.01)
*D06P 3/24* (2006.01)
*D06P 5/30* (2006.01)
*B41J 2/21* (2006.01)

(52) U.S. Cl.
CPC .......... *C09D 11/033* (2013.01); *C09D 11/037* (2013.01); *C09D 11/107* (2013.01); *C09D 11/322* (2013.01); *C09D 11/38* (2013.01); *C09D 11/40* (2013.01); *D06P 3/24* (2013.01); *D06P 5/30* (2013.01)

(58) Field of Classification Search
CPC ... C09D 11/322; C09D 11/324; C09D 11/328; C09D 11/101; C09D 11/102; C09D 11/005; C09D 11/54; C09D 11/52; C09D 11/106; C09D 11/326; C09D 11/03; C09D 11/037; C09D 11/033; C09D 151/08; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 21/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 11/00; C14C 11/006; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; B41M 5/0076; G02B 5/20; G02B 5/223; C08K 3/11; C08K 2003/2237

See application file for complete search history.

(56) References Cited

U.S. PATENT DOCUMENTS

| | | | |
|---|---|---|---|
| 2004/0063809 A1* | 4/2004 | Fu | C09D 11/36 523/160 |
| 2004/0085418 A1 | 5/2004 | Yau et al. | |
| 2005/0199152 A1* | 9/2005 | Hale | D06P 1/0004 101/491 |
| 2006/0098066 A1 | 5/2006 | Bauer | |
| 2009/0226679 A1 | 9/2009 | Yatake et al. | |
| 2015/0056552 A1 | 2/2015 | Bentley et al. | |
| 2015/0166803 A1* | 6/2015 | Jhaveri | C09D 11/107 427/385.5 |

FOREIGN PATENT DOCUMENTS

| | | |
|---|---|---|
| EP | 1371697 | 12/2003 |
| WO | 2006074483 | 7/2006 |

\* cited by examiner

300

```
Separately ejecting i) an ink composition having an acidic pH and
ii) a crosslinker composition having a basic pH from pH 8 to pH 10,
   wherein after ejecting, the ink composition and the crosslinker
      composition are in contact on a synthetic fabric substrate, the ink composition including from 60 wt% to 90 wt% water, from 5
wt% to 30 wt% organic co-solvent, from 1 wt% to 6 wt% pigment, a
    sulfonated dispersant, and an acrylic polymer binder, and the crosslinker composition including from 70 wt% to 95 wt%
water, from 1 wt% to 25 wt% organic co-solvent, and from 0.5 wt%
                   to 5 wt% polycarbodiimide
```
— 310

FIG. 3

FLUID SETS

BACKGROUND

Inkjet printing has become a popular way of recording images on various media. Some of the reasons include low printer noise, variable content recording, capability of high speed recording, and multi-color recording. These advantages can be obtained at a relatively low price to consumers. As the popularity of inkjet printing increases, the types of use also increase providing demand for new ink compositions. In one example, textile printing can have various applications including the creation of signs, banners, artwork, apparel, wall coverings, window coverings, upholstery, pillows, blankets, flags, tote bags, clothing, etc. However, the permanence of printed ink on textiles can be an issue, such as when using aqueous inks on synthetic fabric substrates.

BRIEF DESCRIPTION OF DRAWINGS

FIG. 3 depicts an example method of textile printing in accordance with the present disclosure.

DETAILED DESCRIPTION

Figure 1:
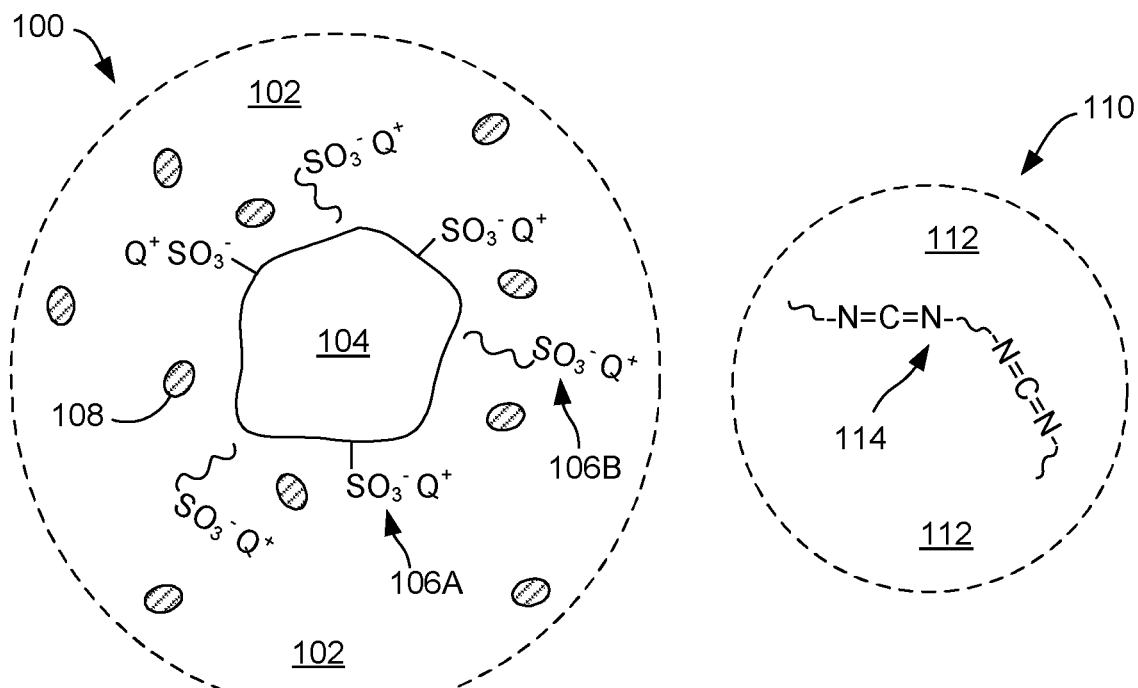
FIG. 1 schematically represents an example fluid set, including an ink composition and a crosslinker composition, in accordance with the present disclosure.

Digital printing on synthetic fabric can be carried out using ink compositions and crosslinker compositions, printed in contact on the synthetic fabric. These compositions, in one example, can even be suitable for digital printing using thermal inkjet printing technology, which is typically a less expensing ejection technology, than piezoelectric printing. Furthermore, the ink compositions can also have good stability, jettability, color gamut, and washfastness (durability through fabric washing cycles when printed with the crosslinker compositions) on various synthetic fabrics, including nylons.

In accordance with this, the present disclosure is drawn to a fluid set which can include an ink composition and a crosslinker composition. The ink composition can have an acidic pH, and can include from 60 wt % to 90 wt % water, from 5 wt % to 30 wt % organic co-solvent, from 1 wt % to 6 wt % pigment, a sulfonated dispersant, and an acrylic polymer binder. The crosslinker composition can have a basic pH from pH 8 to pH 10, and can include from 70 wt % to 95 wt % water, from 1 wt % to 25 wt % organic co-solvent, and from 0.5 wt % to 5 wt % polycarbodiimide. In one example, the pigment of the ink composition can be a self-dispersed pigment, and the sulfonated dispersant can be covalently attached to the surface of the pigment. In another example, the pigment can be a surfactant- or polymer-dispersed pigment, and the sulfonated dispersant can be ionically associated with or adsorbed onto the surface of the pigment. In the ink composition, the acrylic polymer binder can be a styrene C3-C5 alkyl (meth)acrylic polymer binder having a weight average molecular weight from 100,000 Mw to 500,000 Mw. For example, the styrene C3-C5 alkyl (meth)acrylic polymer binder can be a styrene butyl acrylic polymer binder having an average particle size from 20 nm to 300 nm. In another example, the acrylic polymer binder can have an acid number from 5 mg/g to less than 100 mg/g.

In another example, a synthetic textile printing system can include an ink composition, a crosslinker composition, and a synthetic fiber substrate. The ink composition can have an acidic pH, and can include from 60 wt % to 90 wt % water, from 5 wt % to 30 wt % organic co-solvent, from 1 wt % to 6 wt % pigment, a sulfonated dispersant, and an acrylic polymer binder. The crosslinker composition can have a basic pH from pH 8 to pH 10, and can include from 70 wt % to 95 wt % water, from 1 wt % to 25 wt % organic co-solvent, and from 0.5 wt % to 5 wt % polycarbodiimide. In one example, the pigment of the ink composition can be a self-dispersed pigment, and the sulfonated dispersant can be covalently attached to the surface of the pigment. In another example, the pigment can be a sulfonated surfactant- or polymer-dispersed pigment, and the sulfonated dispersant can be ionically associated with or adsorbed onto the surface of the pigment. Also in the ink composition, the acrylic polymer binder can be a styrene C3-C5 alkyl (meth)acrylic polymer binder having a weight average molecular weight from 100,000 Mw to 500,000 Mw. In one example, the ink composition can be loaded in a thermal inkjet ejector and the crosslinker composition can be loaded in a fluidjet ejector. In further detail, the synthetic fabric substrate can be a nylon substrate.

In another example, a method of synthetic textile printing can include separately ejecting an ink composition having an acidic pH and a crosslinker composition having a basic pH from pH 8 to pH 10. After ejecting, the ink composition and the crosslinker composition can be in contact on a synthetic fabric substrate. The ink composition can have an acidic pH, and can include from 60 wt % to 90 wt % water, from 5 wt % to 30 wt % organic co-solvent, from 1 wt % to 6 wt % pigment, a sulfonated dispersant, and an acrylic polymer binder. The crosslinker composition can have a basic pH from pH 8 to pH 10, and can include from 70 wt % to 95 wt % water, from 1 wt % to 25 wt % organic co-solvent, and from 0.5 wt % to 5 wt % polycarbodiimide. In one example, the synthetic fabric substrate can be a nylon substrate. In further detail, the method can include curing the ink composition contacted with the crosslinker composition on the synthetic fabric substrate at a temperature from 120° C. to 180° C. for from 1 to 5 minutes.

It is noted that when discussing the fluid set, the textile printing system, or the method of textile printing, each of these discussions can be considered applicable to other examples whether or not they are explicitly discussed in the context of that example. Thus, for example, in discussing a pigment related to the ink composition, such disclosure is also relevant to and directly supported in context of the textile printing system or the method of textile printing, and vice versa.

Turning now to FIG. 1, an ink composition 100 can include a liquid vehicle 102 (which can include water and organic co-solvent, for example) with from 1 wt % to 6 wt % pigment 104 (or pigment particles or solids) dispersed therein. The pigment can be dispersed by a sulfonated dispersant, such as a sulfonated small molecule covalently attached to a surface of the pigment, shown by example at 106A where $Q^+$ is H, and/or a monovalent cation, such as an alkali metal (e.g., sodium, potassium, etc.), ammonium, quaternary ammonium, or the like. Since the pH of the ink composition of the present disclosure can be less than pH 7 (to allow for reaction with the polycarbodiimide crosslinking agent present in the crosslinker composition), depending on the specific pH, there can be "sulfonates" in sulfonic acid form. Thus, the term "sulfonate" or "sulfonated" herein includes both a number of sulfonic acids as well as a number of salted sulfonates. Examples of pigment dispersions with pigments dispersed with sulfonates or sulfonic acids (small molecule, surfactant, or polymer) include CAB-O-JET® 200 (black), CAB-O-JET® 250C (cyan), CAB-O-JET® 265M (magenta), OR CAB-O-JET® 270Y (yellow), from Cabot Corporation (USA). These pigment dispersions are dispersed with small molecule sulfonates attached to a surface thereof. Alternatively, the pigment can be dispersed with a sulfonated surfactant or sulfonated polymer, shown by example at 106B where $Q^+$ is H and/or a monovalent cation, such as an alkali metal (e.g., sodium, potassium, etc.), ammonium, quaternary ammonium, or the like. Examples include Jetsperse® AQD KCMY pigments from Sun Chemical (USA). Other pigments can also be used and dispersed either using sulfonated small molecules attached to a surface of the pigment, or by using pigments separately dispersed by sulfonated surfactant or sulfonated polymer. Such pigments can be any of a number of pigments of any of a number of primary or secondary colors, or can be black or white, for example. More specifically, colors can include cyan, magenta, yellow, red, blue, violet, red, orange, green, etc. In one example, the ink composition can be a black ink with a carbon black pigment. In another example, the ink composition can be a cyan or green ink with a copper phthalocyanine pigment, e.g., Pigment Blue 15:0, Pigment Blue 15:1; Pigment Blue 15:3, Pigment Blue 15:4, Pigment Green 7, Pigment Green 36, etc. In another example, the ink composition can be a magenta ink with a quinacridone pigment or a co-crystal of quinacridone pigments. Exemplary quinacridone pigments that can be utilized can include PR122, PR192, PR202, PR206, PR207, PR209, PO48, PO49, PV19, PV42, or the like. These pigments tend to be magenta, red, orange, violet, or other similar colors. In one example, the quinacridone pigment can be PR122, PR202, PV19, or a combination thereof. In another example, the ink composition can be a yellow ink with an azo pigment, e.g., Pigment Yellow 74 and Pigment Yellow 155.

In further detail, the ink compositions 100 can also include an acrylic polymer binder 108. The term "acrylic polymer binder" generally refers to any polymer binder prepared from an acrylate monomer and/or a lower alkyl (C1-C5) modified-acrylate monomer, e.g., methacrylates, methyl acrylates, methyl methacrylates, ethyl acrylates, butyl acrylates, butyl methacrylates, pentyl acrylates, etc. The acrylic polymer can have an acid number from 5 mg/g to less than 100 mg/g. In further detail, the acrylic polymer binder can be present at a relatively high concentration, e.g., from 3 wt % to 15 wt %, from 5 wt % to 10 wt %, or from 6 wt % to 8 wt %, for example. The acrylic polymer binder can be in acid form, such as in the form of a poly(meth)acrylic acid or copolymer thereof, or may be partially in its salt or ester form, such as in the form of a poly(meth)acrylate or copolymer thereof. However, as the ink compositions of the present disclosure can be formulated at a pH of less than 7, there may be some or essentially all of the acrylic groups (including modified acrylic groups) that are in the acid form. It is the acid form of the acrylic polymer binder that can provide crosslinking with the crosslinker composition, and particularly the polycarbodiimide crosslinking agent. Suitable pH ranges for the ink composition can be from pH 3 to less than pH 7, pH 4 to less than pH 7, pH 5 to less than pH 7, pH 6 to less than pH 7, pH 5 to pH 6.8, pH 5 to pH 6.6, pH 5 to pH 6, pH 6 to pH 6.8, pH 3 to pH 5, etc. It is noted that the term "(meth)acrylic" is intended to independently describe both acrylic polymers as well as methacrylic polymers.

In one example, the acrylic polymer binder can be a styrene C3-C5 alkyl (meth)acrylic polymer binder 108. Example styrene C3-C5 alkyl (meth)acrylic polymer binders that can be suitable for use include styrene propyl acrylic polymer binders, styrene butyl acrylic polymer binders, styrene pentyl acrylic polymer binders, styrene propyl methacrylic polymer binders, styrene butyl methacrylic polymer binders, or styrene pentyl methacrylic polymer binders. The propyl group, the butyl group, or the hexyl group can be a straight chained C3-C5 alkyl group, or a branched C3-C5 alkyl group, for example. In one specific example, the styrene C3-C5 (meth)acrylic polymer binder can be a styrene butyl acrylic polymer binder, such as that available under the tradename Jantex™, e.g., Jantex™ 45 NRF or Jantex™ 924 (from Jantex Inks, USA). The weight average molecular weight of the styrene C3-C5 alkyl (meth)acrylic polymer binder, including specifically the styrene butyl acrylic polymer binder example, can be from 100,000 Mw to 500,000 Mw, or from 140,000 Mw to 320,000 Mw. The acid number of the styrene C3-C5 alkyl (meth)acrylic polymer binder, including specifically the styrene butyl acrylic polymer binder example, can be from 5 mg/g to 100 mg/g, from 5 mg/g to 50 mg/g, or from 5 mg/g to 20 mg/g, for example. Other acrylic polymer binders that can be used include styrene acrylic copolymer emulsions Texicryl™ 13-503 and Texicryl™ 13-813, available from Scott Bader (USA). These styrene acrylic copolymer emulsions have a weight average molecular weight ranging from about 100,000 Mw to 500,000 Mw, and have an acid number from 50 mg/g to 70 mg/g.

As mentioned, the ink compositions 100 of the present disclosure can be formulated to include an aqueous liquid vehicle 102, which can include the water content, e.g., 60 wt % to 90 wt % or from 75 wt % to 85 wt %, as well as organic co-solvent, e.g., from 4 wt % to 30 wt %, from 6 wt % to 20 wt %, or from 8 wt % to 15 wt %. Other liquid vehicle components can also be included, such as surfactant, antibacterial agent, other colorant, etc. However, as part of the ink composition, pigment, the styrene acrylic polymer dispersant, and the styrene C3-C5 alkyl (meth)acrylic polymer binder can be included or carried by the liquid vehicle components.

In further detail regarding the aqueous liquid vehicle, co-solvent(s) of the aqueous liquid vehicle can be any co-solvent or combination of co-solvents that is compatible with the pigment, dispersant, and binder. Examples of suitable classes of co-solvents include polar solvents, such as alcohols, amides, esters, ketones, lactones, and ethers. In additional detail, solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. More specific examples of organic solvents can include 2-pyrrolidone, 2-ethyl-2-(hydroxymethyl)-1, 3-propane diol (EPHD), glycerol, dimethyl sulfoxide, sulfolane, glycol ethers, alkyldiols such as 1,2-hexanediol, and/or ethoxylated glycerols such as LEG-1, etc.

The aqueous liquid vehicle can also include surfactant. In general, the surfactant can be water soluble and may include alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, alcohol ethoxylated surfactants, fluorosurfactants, and mixtures thereof. In some examples, the surfactant can include a nonionic surfactant, such as a Surfynol surfactant, e.g., Surfynol 440 (from Evonik, Germany), or a Tergitol™ surfactant, e.g., Tergitol™ TMN-6 (from Dow Chemical, USA). In another example, the surfactant can include an anionic surfactant, such as a phosphate ester of a C10 to C20 alcohol or a polyethylene glycol (3) oleyl mono/di phosphate, e.g., Crodafos® N3A (from Croda International PLC, United Kingdom). The surfactant or combinations of surfactants, if present, can be included in the ink composition at from about 0.01 wt % to about 5 wt % and, in some examples, can be present at from about 0.05 wt % to about 3 wt % of the ink compositions.

Consistent with the formulations of the present disclosure, various other additives may be included to provide desired properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Acticide®, e.g., Acticide® B20 (Thor Specialties Inc.), Nuosept™ (Nudex, Inc.), Ucarcide™ (Union carbide Corp.), Vancide® (R.T. Vanderbilt Co.), Proxel™ (ICI America), and combinations thereof. Sequestering agents such as EDTA (ethylene diamine tetra acetic acid) may be included to eliminate the deleterious effects of heavy metal impurities, and buffer solutions may be used to control the pH of the ink. Viscosity modifiers and buffers may also be present, as well as other additives known to those skilled in the art to modify properties of the ink as desired.

As also shown in FIG. 1, a crosslinker composition 110 is also shown, which can include a polycarbodiimide 114 dispersed in a liquid vehicle 112. Notably, the liquid vehicle in the ink composition and the liquid vehicle in the crosslinker composition are not typically the same liquid vehicle formulation, but can have common ingredients, such as water, for example. Both can also include an organic co-solvent (that may or may not be the same selected co-solvent (s)). Thus, the discussion of the liquid vehicle described herein related to the ink composition is also relevant to the liquid vehicle of the crosslinker composition, and the same types of liquid vehicle components can be independently selected for use in the crosslinker composition.

With specific reference to the polycarbodiimide 114 that is present in the crosslinker composition 110, FIG. 1 presents a representative simplified schematic formula for illustrative purposes only. The polycarbodiimide selected for use can be any of a number of polycarbodiimides with two or more carbodiimide groups, or in some examples, three or more carbodiimide groups, or five or more carboiimide groups. As mentioned, the polycarbodiimide can be present in the crosslinker composition at from 0.5 wt % to 5 wt %, but it can also be present at from 0.5 wt % to 3 wt %, 1 wt % to 5 wt %, 2 wt % to 5 wt %, for example. When the crosslinker composition is printed on the synthetic fabric medium (not shown in FIG. 1, but shown in FIG. 2), the carboxylic acid group in the acrylic polymer binder in the ink composition, the polycarbodiimide in the cros1slinker composition, and in some instances, the surface of the synthetic fabric medium can interact to generate a durable image that exhibits durable washfastness as demonstrated in the examples hereinafter.

A non-limiting but illustrative example reaction between a carboxylic acid group, such as can be present on an acrylic polymer binder, and a carbodiimide group, such as can be present on a polycarbodiimide, is shown as Formula I, as follows:

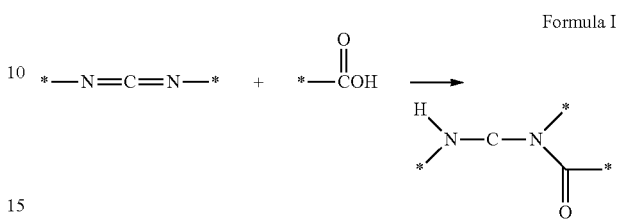

In this example, the pH of the ink composition that includes the carboxylic acid group on the acrylic polymer binder can be less than pH 7, and the pH of the crosslinker composition that is contacted (e.g., overprinted or underprinted) with the ink composition on the synthetic fabric substrate can be from pH 8 to pH 10, or in one example, from pH 8.5 to pH 10.

In further detail, in accordance with examples of the present disclosure, the polycarbodiimides present in the crosslinker composition can interact with the acrylic polymer binder, acting as a dehydration agent to cause the acrylic- or acrylic-derived group of the polymer binder to form an amide linkage, as shown in Formula I above. Other types of reactions can also occur, but Formula I is provided by way of example to illustrate one type of reaction that can occur when the ink composition comes into contact with the crosslinker composition, e.g., interaction or reaction with the synthetic substrate, interaction or reaction between different types of acrylic polymer binder and/or different types of polycarbodiimides, interactions or reactions with different molar ratios (other than 1:1, for example) than that shown in Formula I, etc.

Figure 2:
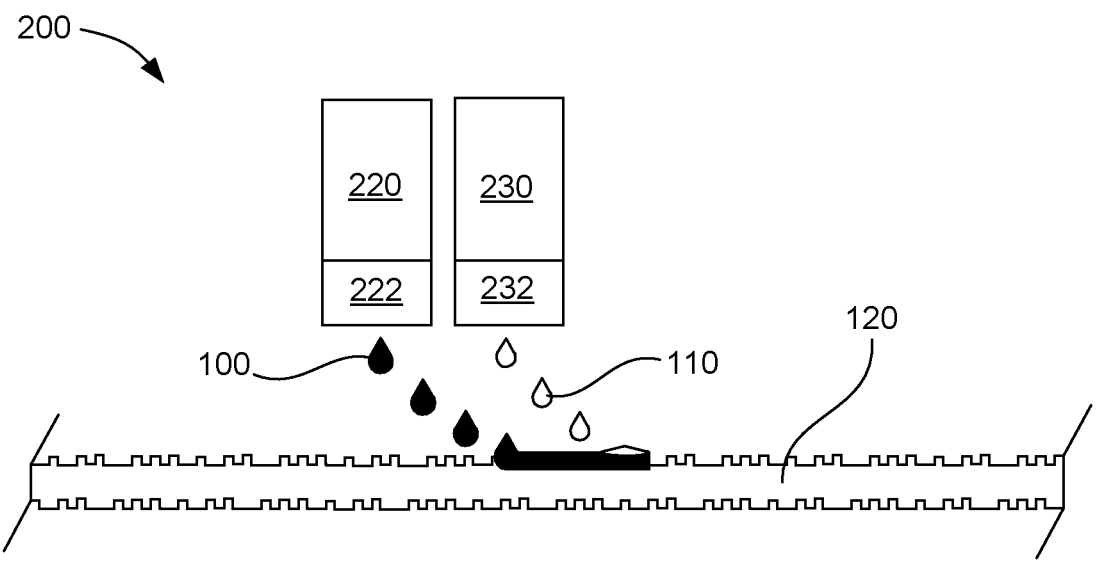
FIG. 2 schematically depicts an example textile printing system that includes an ink composition, a crosslinker composition, and a synthetic fabric substrate.

As shown in FIG. 2, a synthetic textile printing system 200 is shown schematically and can include an ink composition 100 for printing on a synthetic fabric substrate 120. For example, the ink composition can be printed from an inkjet pen 220 which includes an ejector 222, such as a thermal inkjet ejector. These ink compositions can be suitable for printing on many types of textiles, but can be particularly acceptable for printing on synthetic fabric substrates. Exemplary synthetic fibers can include polymeric fibers such as, nylon fibers, polyvinyl chloride (PVC) fibers, PVC-free fibers made of polyester, polyamide, polyimide, polyacrylic, polypropylene, polyethylene, polyurethane, polystyrene, polyaramid (e.g., Kevlar®) polytetrafluoroethylene (Teflon®) (both trademarks of E. I. du Pont de Nemours Company, Delaware), fiberglass, polytrimethylene, polycarbonate, polyethylene terephthalate, polyester terephthalate, polybutylene terephthalate, or a combination thereof. In some examples, the synthetic fiber can be a modified fiber from the above-listed polymers. The term "modified fiber" refers to one or both of the polymeric fiber and the fabric as a whole having undergone a chemical or physical process such as, but not limited to, one or more of a copolymerization with monomers of other polymers, a chemical grafting reaction to contact a chemical functional group with one or both the polymeric fiber and a surface of the fabric, a plasma treatment, a solvent treatment, acid etching, or a biological treatment, an enzyme treatment, or antimicrobial treatment to prevent biological degradation.

The term "PVC-free fibers" as used herein means that no polyvinyl chloride (PVC) polymer or vinyl chloride monomer units are in the fibers.

With specific reference to synthetic fabric substrates that are nylon, or which may include nylon, it has been found that it can be a challenge to achieve good washfastness when printing on nylon using water-based pigmented ink compositions in particular because of the hydrophobicity and relatively inert nature of nylon. Oil-based inks are more common for printing on nylon than water-based inks, but tend to be less environmentally friendly. Thus, by printing on synthetic fabric substrates, such as nylon, using the fluid sets described herein, acceptable durability can be achieved, even when repeatedly washed using warm or hot water, for example. Nylons can also be referred to generally as aliphatic or semi-aromatic polyamides, and can be identified using a number system where a single number refers to a monadic homopolymer with a specific number of carbons in each monomer unit (including carboxylic acids), and multiple numbers indicates a dyadic homopolymer prepared from a diamine and a dicarboxylic acid. Examples of specific nylons of this type that can be used in accordance with examples of the present disclosure include Nylon 6 (e.g., prepared from ε-caprolactam), Nylon 510 (e.g. prepared from hexamethylenediamine and sebacic acid), Nylon 66, Nylon 610, Nylon 16, etc. Copolymers of two different types of nylons can be separated by a slash or "/," such as Nylon 6/66 (made from caprolactam, hexamethylenediamine and adipic acid), Nylon 66/610 (made from hexamethylenediamine, adipic acid and sebacic acid), etc. Any of these nylons, or even other nylons can be used in accordance with examples of the present disclosure. As a note, nylons can also be referred to as polyamides, using the prefix "PA" along with the same numbering system, e.g., PA-6, PA-510, PA-610, etc.

In further detail, the synthetic textile printing system 200 can include a crosslinker composition 110, which can include a polycarbodiimide dispersed in a liquid vehicle, as previously mentioned. The crosslinker composition can be printed from a fluidjet pen 230 which includes an ejector 232, such as a fluid ejector which can also be a thermal inkjet ejector. As mentioned, in one example, the polycarbodiimide of the crosslinker composition can interact with the acrylic polymer binder (of the ink composition 100), and can form an amide linkage.

Using this fluid set on synthetic fabric substrates, durable images can be prepared that have acceptable optical density (OD) and/or washfastness properties. The term "washfastness" can be defined as the OD that is retained or delta E (ΔE) after five (5) standard washing machine cycles using warm water and a standard clothing detergent (e.g., Tide® available from Proctor and Gamble, Cincinnati, Ohio, USA). By measuring OD and/or L*a*b* both before and after washing, ΔOD and ΔE value can be determined, which is essentially a quantitative way of expressing the difference between the OD and/or L*a*b* prior to and after undergoing the washing cycles. Thus, the lower the ΔOD and ΔE values, the better. In further detail, ΔE is a single number that represents the "distance" between two colors, which in accordance with the present disclosure, is the color (or black) prior to washing and the modified color (or modified black) after washing.

Colors, for example, can be expressed as CIELAB values. It is noted that color differences may not be symmetrical going in both directions (pre-washing to post washing vs. post-washing to pre-washing). Using the CIE 1976 definition, the color difference can be measured and the ΔE value calculated based on subtracting the pre-washing color values of L*, a*, and b* from the post-washing color values of L*, a*, and b*. Those values can then be squared, and then a square root of the sum can be determined to arrive at the ΔE value. The 1976 standard can be referred to herein as "$\Delta E_{CIE}$." The CIE definition was modified in 1994 to address some perceptual non-uniformities, retaining the L*a*b* color space, but modifying to define the L*a*b* color space with differences in lightness (L*), chroma (C*), and hue (h*) calculated from L*a*b* coordinates. Then in 2000, the CIEDE standard was established to further resolve the perceptual non-uniformities by adding five corrections, namely i) hue rotation ($R_T$) to deal with the problematic blue region at hue angles of about 275°), ii) compensation for neutral colors or the primed values in the L*C*h differences, iii) compensation for lightness ($S_L$), iv) compensation for chroma ($S_C$), and v) compensation for hue ($S_H$). The 2000 modification can be referred to herein as "$\Delta E_{2000}$." In accordance with examples of the present disclosure, ΔE value can be determined using the CIE definition established in 1976, 1994, and 2000 to demonstrate washfastness. However, in the examples of the present disclosure, $\Delta E_{CIE}$ is used.

In further detail regarding the synthetic fabric substrates 120 that can be used, the structure can be, for example, a textile, a cloth, a fabric material, fabric clothing, or other fabric product suitable for applying ink, the synthetic fabric substrate can have any of a number of fabric structures. The term "fabric structure" is intended to include structures that can have warp and weft, and/or can be woven, non-woven, knitted, tufted, crocheted, knotted, and pressured, for example. The terms "warp" and "weft" have their ordinary meaning in the textile arts, as used herein, e.g., warp refers to lengthwise or longitudinal yarns on a loom, while weft refers to crosswise or transverse yarns on a loom.

It is notable that the term "fabric substrate" does not include materials commonly known as any kind of paper (even though paper can include multiple types of natural and synthetic fibers or mixtures of both types of fibers). Synthetic fabric substrates can include textiles in filament form, textiles in the form of fabric material, or textiles in the form of fabric that has been crafted into a finished article (e.g. clothing, blankets, tablecloths, napkins, towels, bedding material, curtains, carpet, handbags, shoes, banners, signs, flags, etc.). In some examples, the synthetic fabric substrate can have a woven, knitted, non-woven, or tufted fabric structure. In one example, the synthetic fabric substrate can be a woven fabric where warp yarns and weft yarns can be mutually positioned at an angle of about 90°. This woven fabric can include but is not limited to, fabric with a plain weave structure, fabric with twill weave structure where the twill weave produces diagonal lines on a face of the fabric, or a satin weave. In another example, the synthetic fabric substrate can be a knitted fabric with a loop structure. The loop structure can be a warp-knit fabric, a weft-knit fabric, or a combination thereof. A warp-knit fabric refers to every loop in a fabric structure that can be formed from a separate yarn mainly introduced in a longitudinal fabric direction. A weft-knit fabric refers to loops of one row of fabric that can be formed from the same yarn. In a further example, the synthetic fabric substrate can be a non-woven fabric. For example, the non-woven fabric can be a flexible fabric that can include a plurality of fibers or filaments that are one or both bonded together and interlocked together by a chemical treatment process (e.g., a solvent treatment), a mechanical treatment process (e.g., embossing), a thermal treatment process, or a combination of two or more of these processes.

In further detail, the synthetic fabric substrate 120 can be a combination of synthetic fiber type with any other type of fiber, e.g. a combination of any synthetic fiber with any natural fiber, with another synthetic fiber, etc. In some examples, the synthetic fabric substrate can include both synthetic fibers and natural fibers. The amount of each fiber type can vary. For example, if there is a mixture of synthetic fiber with natural fiber, the amount of the synthetic fiber can vary from about 5 wt % to about 95 wt % and the amount of natural fiber can range from about 5 wt % to 95 wt %. In yet another example, the amount of the natural fiber can vary from about 10 wt % to 80 wt % and the synthetic fiber can be present from about 20 wt % to about 90 wt %. In other examples, the amount of the natural fiber can be about 10 wt % to 90 wt % and the amount of synthetic fiber can also be about 10 wt % to about 90 wt %. Likewise the ratio of natural fiber to synthetic fiber in the synthetic fabric substrate can vary. For example, the ratio of natural fiber to synthetic fiber can be 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, or vice versa.

In one example, the synthetic fabric substrate (which can solely include synthetic fibers of one or more type, or can be a combination of synthetic fibers and natural fibers of one or more type) can have a basis weight ranging from about 10 gsm to about 500 gsm. In another example, the synthetic fabric substrate can have a basis weight ranging from about 50 gsm to about 400 gsm. In other examples, the synthetic fabric substrate can have a basis weight ranging from about 100 gsm to about 300 gsm, from about 75 gsm to about 250 gsm, from about 125 gsm to about 300 gsm, or from about 150 gsm to about 350 gsm.

In addition, the synthetic fabric substrate 120 can contain additives including, but not limited to, one or more of colorant (e.g., pigments, dyes, and tints), antistatic agents, brightening agents, nucleating agents, antioxidants, UV stabilizers, fillers and lubricants, for example. Alternatively, the synthetic fabric substrate may be pre-treated in a solution containing the substances listed above before applying other treatments or coating layers.

In another example, and as set forth in FIG. 3, a method 300 of synthetic textile printing can include separately ejecting 310 an ink composition having an acidic pH and a crosslinker composition having a basic pH from pH 8 to pH 10. After ejecting, the ink composition and the crosslinker composition can be in contact on a synthetic fabric substrate. The ink composition can have an acidic pH, and can include from 60 wt % to 90 wt % water, from 5 wt % to 30 wt % organic co-solvent, from 1 wt % to 6 wt % pigment, a sulfonated dispersant (e.g., associated with or attached to a surface of the pigment), and an acrylic polymer binder (e.g., having an acid number from 5 mg/g to less than 100 mg/g). The crosslinker composition can have a basic pH from pH 8 to pH 10, and can include from 70 wt % to 95 wt % water, from 1 wt % to 25 wt % organic co-solvent, and from 0.5 wt % to 5 wt % polycarbodiimide.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

The term "acid value" or "acid number" refers to the mass of potassium hydroxide (KOH) in milligrams that can be used to neutralize one gram of substance (mg/g), such as the acrylic polymer binders disclosed herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following is only exemplary or illustrative of the application of the principles of the presented formulations and methods. Numerous modifications and alternative methods may be devised by those skilled in the art without departing from the spirit and scope of the present disclosure. The appended claims are intended to cover such modifications and arrangements. Thus, while the technology has been described above with particularity, the following provide further detail in connection with what are presently deemed to be the acceptable examples.

Example 1—Preparation of Ink Compositions

Four ink compositions were prepared in accordance with the general formula shown in Table 1, as follows:

TABLE 1

| Ink ID | Magenta 1 (M1) | Magenta 2 (M2) | Cyan (C) | Yellow (Y) |
|---|---|---|---|---|
| Magenta Pigment (PR122/PV19 co-crystal) | 2 wt % | | | |
| ¹Cabojet ® 265 Magenta Pigment (PR122) | | 2 wt % | | |
| ¹Cabojet ® 250 Cyan Pigment (PB15:4) | | | 2 wt % | |
| ²Jetsperse ® AQD YE20 Yellow Pigment (PY74) | | | | 2 wt % |
| ³Jantex ® 924 (Styrene butyl acrylic polymer binder; 320,000 Mw; Acid Number 17.4) | 6 wt % | 6 wt % | 6 wt % | 6 wt % |
| Glycerol (Organic Co-solvent) | 8 wt % | 8 wt % | 8 wt % | 8 wt % |
| LEG-1 (Organic Co-solvent) | 1 wt % | 1 wt % | 1 wt % | 1 wt % |

TABLE 1-continued

| Ink ID | Magenta 1 (M1) | Magenta 2 (M2) | Cyan (C) | Yellow (Y) |
|---|---|---|---|---|
| [4]Crodafos ® N3A (Surfactant) | 0.5 wt % | 0.5 wt % | 0.5 wt % | 0.5 wt % |
| [5]Surfynol ® 440 (Surfactant) | 0.3 wt % | 0.3 wt % | 0.3 wt % | 0.3 wt % |
| [6]Acticide ® B20 (Biocide) | 0.2 wt % | 0.2 wt % | 0.2 wt % | 0.2 wt % |
| Deionized Water | Balance | Balance | Balance | Balance |
| pH adjusted using KOH | 8.5 | 6.6 | 6.6 | 6.6 |

[1]Cabojet ® 265 Magenta and 250 Cyan Pigments are surface modified with sulfonated small molecules and are available from Cabot Corporation (USA).
[2]Jetsperse ® AQD YE20 Yellow Pigment that is dispersed using a sulfonated surfactant available from Sun Chemical (USA).
[3]Jantex™ 924™ is available from Jantex Inks, (USA)
[4]Crodafos™ N3A is available from Croda ® International Plc. (Great Britain).
[5]Surfynol ® 440 is available from Evonik, (Germany).
[6]Acticide ® B20 is available from Thor Specialties, Inc. (USA).

Example 2—Preparation of Crosslinker Composition

Four ink compositions were prepared in accordance with the general formula shown in Table 1, as follows:

TABLE 2

| Crosslinker ID | Crosslinker (XL) |
|---|---|
| 2-pyrrolidinone (Organic co-solvent) | 10 wt % |
| [6]Surfynol ® 440 (Surfactant) | 0.4 wt % |
| [8]Versatex™ Fixer (as is) | 15 wt % (2.025 wt % polycarbodiimide) |
| Water | balance |
| pH adjusted using KOH | 9.4 |

[6]Surfynol ® 440 is available from Evonik, (Germany).
[8]Versatex Fixer includes 13.5 wt % polycarbodiimide and 86.5 wt % water and is available from Jacquard Products (USA).

Example 3—Ink Composition Pigment Stability

Particle size distribution data was collected for the four (4) ink compositions prepared in accordance with Example 1. Specifically, both the volume averaged particle size (Mv) was collected, as well as the particle size at which 95% of the particles (based on number of particles) were smaller and 5% were larger (D95). The initial particle size data was collected using a NanoTrac® 150 particle size system. The pigment particle sizes (both Mv and D95) were then determined again using the NanoTrac® 150 system after undergoing either freeze-thaw cycling (T-cycle) or accelerated shelf-life (ASL) stress.

The freeze-thaw cycling (T-cycle) included 5 freeze-thaw cycles where 30 mL samples were brought to an initial temperature of 70° C. in 20 minutes, and then maintained at 70° C. for 4 hours. The samples were then decreased from 70° C. to −40° C. in 20 minutes and maintained at −40° C. for 4 hours. This process was repeated, such that each sample was subjected to a total of 5 freeze-thaw cycles. Following the fifth cycle, the samples were allowed to equilibrate to room temperature and the Mv and D95 particle sizes were tested.

With respect to accelerated shelf-life (ASL), 30 mL samples were stored in an oven at 60° C. for 7 days. Following the elevated temperature storage period, the samples were allowed to equilibrate to room temperature and the particle sizes (Mv and D95) were tested.

The results of the stability testing are shown in Tables 3A and 3B, where T-cycle=5 Freeze-Thaw Cycles from −40° C. to 70° C.; ASL=Accelerated Shelf Life (ASL) at 60° C. for 1 week; Mv=Volume Averaged Particle Size; D95=95 Percentile Particle Size; and % Δ=Percentile Change from Initial Particle Size (Mv or D95) Compared to After T-cycle or ASL.

TABLE 3A

Volume Averaged Particle Size Stability

| Ink ID | Initial Mv (μm) | T-cycle Mv (μm) | T-cycle Mv (% Δ) | ASL Mv (μm) | ASL Mv (% Δ) |
|---|---|---|---|---|---|
| M1 | 0.147 | 0.145 | −1.6% | 0.145 | −1.5% |
| M2 | 0.138 | 0.140 | 1.2% | 0.139 | 0.2% |
| C | 0.108 | 0.104 | −3.6% | 0.102 | −6.1% |
| Y | 0.141 | 0.142 | 0.6% | 0.133 | −5.8% |

TABLE 3B

D95 Particle Size Stability

| Ink ID | Initial D95 (μm) | T-cycle D95 (μm) | T-cycle D95 (% Δ) | ASL D95 (μm) | ASL D95 (% Δ) |
|---|---|---|---|---|---|
| M1 | 0.215 | 0.235 | 9.2% | 0.232 | −6.2 |
| M2 | 0.220 | 0.225 | 2.3% | 0.211 | −0.4 |
| C | 0.182 | 0.184 | 1.2% | 0.185 | 0.3 |
| Y | 0.213 | 0.226 | 6.4% | 0.217 | 4.6 |

As can be seen in Tables 3A and 3B, the particle size stability for the pigments in the ink compositions was very good both with respect to Mv and D95 under T-cycle and ASL testing protocols. For example, none of the pigments changed in size by more than 10%, and most were around 5% or less.

Example 4—Crosslinker Composition Viscosity Stability

The crosslinker composition prepared in accordance with Example 2 was prepared and the viscosity was tested initially, and then at one (1) week after a week of accelerated shelf life (ASL) testing similar to that described in Example 3. The data collected is provided in Table 4, as follows:

TABLE 4

| Crosslinker ID | Initial Viscosity (cps at 0 wk) | ASL Viscosity (cps at 1 wk; 60° C.) |
|---|---|---|
| XL | 1.1 | 1.1 |

Example 5—Washfastness

The four (4) ink compositions (M1, M2, C, and Y) of Example 1 were each printed on a synthetic fabric substrate, namely nylon, with and without contact with the crosslinker composition (XL) of Example 2. The ink composition was printed on each nylon fabric sample using 3 drops per pixel durability plots, where each drop was about 12 ng in volume, from a thermal inkjet printhead. The crosslinker composition, when applied, was overprinted with respect to the ink composition at 1 drop per pixel (12 ng volume per drop), also from a thermal inkjet printhead. After printing, the printed durability plots were allowed to dry and then cured under heat (150° C. for 3 minutes). The various samples (eight printed ink samples, four with crosslinker and four without crosslinker) were then evaluated to obtain optical density (OD) and L*a*b* color space values, which represented the "pre-washing" values, or reference black or color values. Then, the printed fabric substrates were washed at 40° C. with laundry detergent (e.g., Tide® available from Proctor and Gamble, Cincinnati, Ohio, USA) for 5 cycles, air drying the printed fabric substrates between each washing cycle. After the five cycles, optical density (OD) and L*a*b* values were measured for comparison, and delta E (ΔE) values were calculated using the 1976 standard denoted as $\Delta E_{CIE}$. The data is shown in Table 5 below.

TABLE 5

| | | nylon Substrate | | | | |
|---|---|---|---|---|---|---|
| Ink ID | Crosslinker ID | OD (Pre-Wash) | OD (Post-Wash) | ΔOD | % ΔOD | $\Delta E_{CIE}$ |
| [1]M1 | — | 1.03 | 0.75 | −0.28 | −27.5% | 14.9 |
| [1]M1 | XL | 0.97 | 0.69 | −0.28 | −28.9% | 15.1 |
| [2]M2 | — | 0.86 | 0.65 | −0.21 | −24.4% | 11.7 |
| [2]M2 | XL | 0.87 | 0.79 | −0.08 | −10.1% | 5.1 |
| [2]C | — | 1.05 | 0.82 | −0.23 | −22.3% | 10.7 |
| [2]C | XL | 1.11 | 0.99 | −0.12 | −10.7% | 5.5 |
| [2]Y | — | 1.10 | 0.95 | −0.15 | −14.1% | 9.6 |
| [2]Y | XL | 1.08 | 0.99 | −0.09 | −8.9% | 6.2 |

[1]pH 8.5
[2]pH 6.6

As can be seen in the data presented in Table 5, with the magenta ink having a pH of 8.5 (M1), no washfastness improvement was achieved for either OD or ΔE with the crosslinker composition. On the other hand, with respect to the ink compositions having a pH of less than 7, e.g., M2, C, and Y at pH 6.6, the ink composition of every primary color (CMY) improved with respect to washfastness (OD and ΔE) when contacted by the crosslinker composition (in this case, by overprinting).

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. A fluid set, comprising:
   an ink composition having an acidic pH, the ink composition, comprising:
      from 60 wt % to 90 wt % water,
      from 5 wt % to 30 wt % organic co-solvent,
      from 1 wt % to 6 wt % pigment,
      a sulfonated dispersant, and
      an acrylic polymer binder; and
   a crosslinker composition having a basic pH from pH 8 to pH 10, comprising:
      from 70 wt % to 95 wt % water,
      from 1 wt % to 25 wt % organic co-solvent, and
      from 0.5 wt % to 5 wt % polycarbodiimide.

2. The fluid set of claim 1, wherein the pigment is a self-dispersed pigment, and the sulfonated dispersant is covalently attached to the surface of the pigment.

3. The fluid set of claim 1, wherein the pigment is a surfactant- or polymer-dispersed pigment, and the sulfonated dispersant is ionically associated with or adsorbed onto the surface of the pigment.

4. The fluid set of claim 1, wherein the acrylic polymer binder is a styrene C3-C5 alkyl (meth)acrylic polymer binder having a weight average molecular weight from 100,000 Mw to 500,000 Mw.

5. The fluid set of claim 4, wherein the styrene C3-C5 alkyl (meth)acrylic polymer binder is a styrene butyl acrylic polymer binder having an average particle size from 20 nm to 300 nm.

6. The fluid set of claim 1, wherein the acrylic polymer binder has an acid number from 5 mg/g to less than 100 mg/g.

7. A synthetic textile printing system, comprising:
   an ink composition having an acidic pH, the ink composition, comprising:
      from 60 wt % to 90 wt % water,
      from 5 wt % to 30 wt % organic co-solvent,
      from 1 wt % to 6 wt % pigment,
      a sulfonated dispersant, and
      an acrylic polymer binder; and
   a crosslinker composition having a basic pH from pH 8 to pH 10, comprising:
      from 70 wt % to 98 wt % water,
      from 1 wt % to 25 wt % organic co-solvent, and
      from 0.5 wt % to 5 wt % polycarbodiimide; and
   a synthetic fabric substrate.

8. The synthetic textile printing system of claim 7, wherein the pigment is a self-dispersed pigment, and the sulfonated dispersant is covalently attached to the surface of the pigment.

9. The synthetic textile printing system of claim 7, wherein the pigment is a surfactant- or polymer-dispersed pigment, and the sulfonated dispersant is ionically associated with or adsorbed onto the surface of the pigment.

10. The synthetic textile printing system of claim 7, wherein the acrylic polymer binder is a styrene C3-C5 alkyl (meth)acrylic polymer binder having a weight average molecular weight from 100,000 Mw to 500,000 Mw.

11. The synthetic textile printing system of claim 7, wherein the ink composition is loaded in a thermal inkjet ejector and the crosslinker composition is loaded in a fluidjet ejector.

12. The synthetic textile printing system of claim 7, wherein the synthetic fabric substrate is a nylon substrate.

13. A method of synthetic textile printing, comprising separately ejecting i) an ink composition having an acidic pH and ii) a crosslinker composition having a basic pH from pH 8 to pH 10, wherein after ejecting, the ink composition and the crosslinker composition are in contact on a synthetic fabric substrate,
   the ink composition, comprising:
      from 60 wt % to 90 wt % water,
      from 5 wt % to 30 wt % organic co-solvent,
      from 1 wt % to 6 wt % pigment,
      a sulfonated dispersant, and
      an acrylic polymer binder; and
   the crosslinker composition, comprising:
      from 70 wt % to 95 wt % water,
      from 1 wt % to 25 wt % organic co-solvent, and
      from 0.5 wt % to 5 wt % polycarbodiimide.

14. The method of claim 13, wherein the synthetic fabric substrate is a nylon substrate.

15. The method of claim 13, further comprising curing the ink composition contacted with the crosslinker composition on the synthetic fabric substrate at a temperature from 120° C. to 180° C. for from 1 to 5 minutes.

16. The fluid set of claim 1, wherein the ink composition has a pH from 3 to 6.8.

* * * * *